United States Patent
Toukura (10) Patent No.: US 7,527,885 B2
(45) Date of Patent: May 5, 2009

(54) FUEL CELL CONTROL SYSTEM AND METHOD

(75) Inventor: Nobusuke Toukura, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1013 days.

(21) Appl. No.: 10/491,439

(22) PCT Filed: May 29, 2003

(86) PCT No.: PCT/JP03/06768

§ 371 (c)(1),
(2), (4) Date: Apr. 13, 2004

(87) PCT Pub. No.: WO04/000601

PCT Pub. Date: Dec. 31, 2003

(65) Prior Publication Data

US 2004/0247962 A1    Dec. 9, 2004

(30) Foreign Application Priority Data

Jun. 19, 2002    (JP)    ............................. 2002/178975

(51) Int. Cl.
H01M 8/04    (2006.01)

(52) U.S. Cl. .......................................... 429/22; 429/25

(58) Field of Classification Search .................... 429/22, 429/25
See application file for complete search history.

(56) References Cited

U.S. PATENT DOCUMENTS 6,497,972 B1    12/2002    Iwasaki
2002/0058167 A1    5/2002    Charlat

FOREIGN PATENT DOCUMENTS

| DE | 100 33 036 A1 | 1/2001 |
| EP | 1 195 830 A2 | 4/2002 |
| JP | 2002-63925 A | 2/2002 |
| WO | WO 02/27848 A2 | 4/2002 |

*Primary Examiner*—Patrick Ryan
*Assistant Examiner*—Muhammad Siddiquee
(74) *Attorney, Agent, or Firm*—Foley & Lardner LLP (57) ABSTRACT

When an electric power generation demand occurs for a fuel cell stack 1, an electric power stored in a battery 8 is commenced to be supplied to a load (step S3) followed by setting a period (step S2), in which a sensor signal from a fuel cell system 10 is held in a preceding value, in a subtraction timer, and when discrimination is made (step S5, step S6) that the fuel cell system 10 is started up and each pressure is stabilized from a sensor signal from the fuel cell system 10, the electric power generated in the fuel cell stack 1 is commenced to be supplied to the load (step S8) followed by setting the period, in which the sensor signal from the fuel cell system 10 is held in the preceding value, in the subtraction timer (step S7).

13 Claims, 6 Drawing Sheets

FUEL CELL CONTROL SYSTEM AND METHOD

TECHNICAL FIELD

The present invention relates to a control system and method of a fuel cell that generates an electric power for driving a drive motor of a fuel cell powered vehicle.

BACKGROUND ART

Normally, in order to increase an electric power generating efficiency of a fuel cell stack in a fuel cell system, there is a need for increasing an electric power voltage of the fuel cell stack. However, if an electric power supply formed by the fuel cell stack is turned on or off under a condition where an output voltage of the fuel cell stack is increased, in a case where an initial resistance value of a connection equipment of the fuel cell stack is low, it is probable that a large electric current flows through connecting parts.

On the contrary, a fuel cell system described in Japanese Patent Provisional Publication No. 2002-063925 is configured to prevent a high voltage from being applied to equipments of a direct current electric power system by providing a shut-off circuit for thereby protecting connecting equipments of a fuel cell stack.

DISCLOSURE OF THE INVENTION

Further, in a normal fuel cell system, during electric power generation of the fuel cell stack, first, it is necessary to supply fuel gas and oxidizing gas under a state to enable the fuel cell stack to generate the electric power and, if these gas pressures exceeds given levels, electric power generation is commenced to allow electric current to be taken out from the fuel cell stack.

However, with such a fuel cell system, since a large electric current flows at the same time that the electric power is taken out from the fuel cell stack, there seems to be a probability in that detection noises occur even though a pressure sensor for fuel gas and a temperature sensor do not form equipments of a direct current electric power system with respect to an electric current system of the fuel cell system. Thus, if large noises occur in a sensor signal related to, for instance, a fuel gas pressure, erroneous discrimination is made that a large differential pressure is created between fuel gas and oxidizing gas and, further, erroneous discrimination is made that the differential pressure between fuel gas and oxidizing gas falls in a high value that induces an operational inability, providing a probability of resultant interruption of the fuel cell system per se.

Thus, the present invention has been made in view of the above actual states and a first aspect of the present invention is a fuel cell control system comprising a fuel cell stack, a fuel cell system taking out an electric power generated by the fuel stack to be supplied to a load, and a control section controlling an electric power generating operation of the fuel cell stack based on a sensor signal inputted from a sensor disposed in the fuel cell system, wherein the control section controls the fuel cell system such that, during startup of the fuel cell system, a gas supply pressure of the fuel cell stack in compliance with the sensor signal inputted from the sensor is discriminated to be stabilized at an electric power generation start pressure of the fuel cell stack, a time duration, involving an electric power taking out start timing at which an electric power is taken out from the fuel cell stack, is set as a period in which the sensor signal is held in a preceding value and gas supply to the fuel cell stack is commenced based on the sensor signal held in the preceding value.

A second aspect of the present invention is a fuel cell control system comprising a fuel cell stack, a fuel cell system taking out an electric power generated by the fuel stack to be supplied to a load, and a control section controlling an electric power generating operation of the fuel cell stack based on a sensor signal inputted from a sensor disposed in the fuel cell system, wherein the control section controls the fuel cell system such that, during stop of the fuel cell system, a gas supply pressure of the fuel cell stack in compliance with the sensor signal inputted from the sensor is discriminated to be stabilized, a time duration, involving an electric power taking out start timing at which an electric power is taken out from the fuel cell stack, is set as a period in which the sensor signal is held in a preceding value and gas supply to the fuel cell stack is interrupted based on the sensor signal held in the preceding value.

A third aspect of the present invention is a fuel cell control method comprising calculating a gas supply pressure related to a fuel cell stack from a sensor signal inputted from a sensor disposed in a fuel cell system during startup of the fuel cell system, discriminating that the gas supply pressure is stabilized at an electric power generation start pressure of the fuel cell stack, setting a time duration, involving an electric power taking out start timing at which an electric power is taken out from the fuel cell stack, as a period in which the sensor signal is held in a preceding value, and controlling the fuel cell system so as to begin gas supply to the fuel cell stack based on the sensor signal held in the preceding value.

A fourth aspect of the present invention is a fuel cell control method comprising calculating a gas supply pressure related to a fuel cell stack from a sensor signal inputted from a sensor disposed in a fuel cell system during stop of the fuel cell system, discriminating that the gas supply pressure is stabilized at an electric power generation start pressure of the fuel cell stack, setting a time duration, involving an electric power taking out start timing at which an electric power is taken out from the fuel cell stack, as a period in which the sensor signal is held in a preceding value; and controlling the fuel cell system so as to stop gas supply to the fuel cell stack based on the sensor signal held in the preceding value.

BEST MODE FOR CARRYING OUT THE INVENTION

Hereinafter, an embodiment according to the present invention is described with reference to the drawings.

Figure 1:
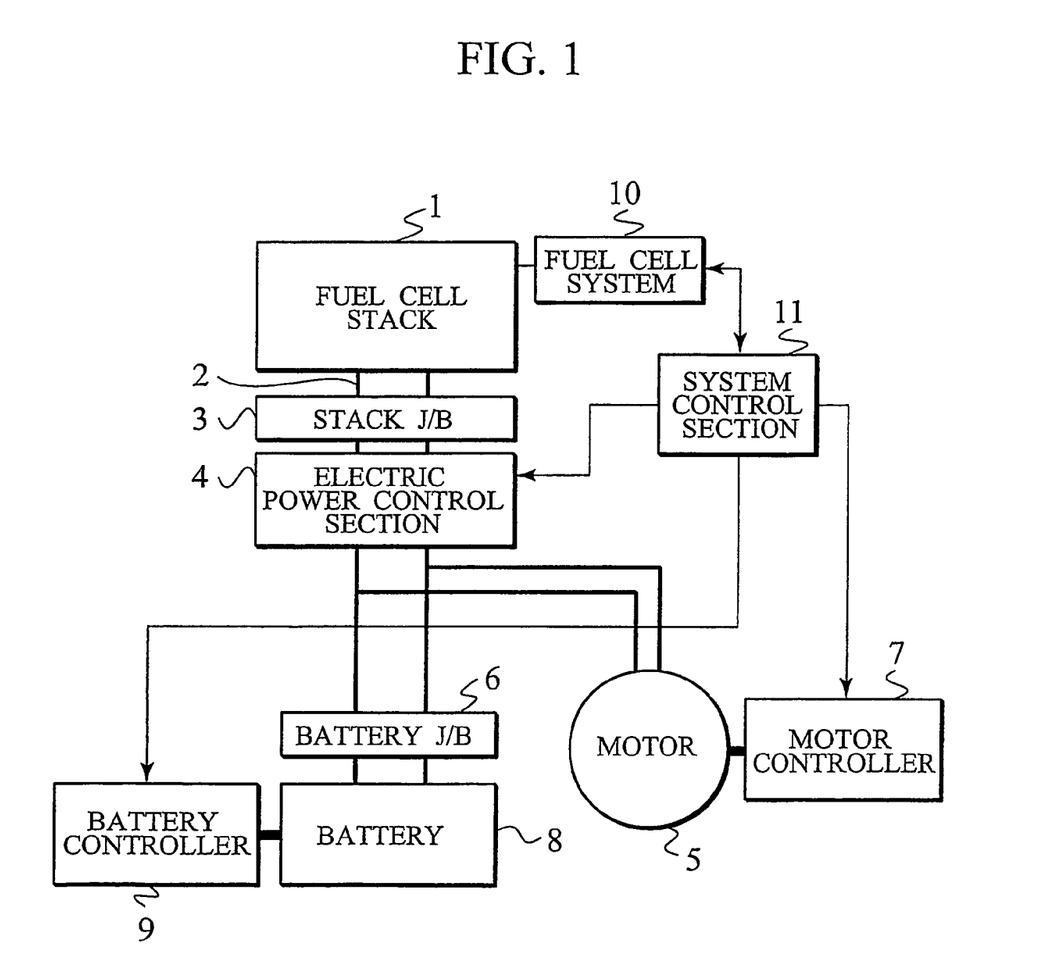
FIG. 1 is a block diagram illustrating a structure of a control device of a fuel cell system to which the present invention is applied.

The present invention is applied to a control device 100 of a fuel cell system structured as shown in FIG. 1. The control system 100 of the fuel cell system is installed, for instance, in a fuel cell powered vehicle having a fuel cell stack 1 as a drive source. The fuel cell stack 1 serves to achieve electrochemical reaction between fuel gas, such as hydrogen or the like, and oxidizing gas containing oxygen by means of electrolyte, thereby directly taking out electric power from electrodes.

In the control system 100 of such a fuel cell system, the fuel cell stack 1 is connected to a stack J/B (junction box) 3 and an electric power control section 4 with high voltage line 2. An electric power output voltage generated at the fuel cell stack 1 is supplied to the stack J/B 3 whereupon the output voltage is regulated by the electric power control section 4 and supplied to a drive motor 5 and a battery J/B 6. By so doing, the drive motor 5 produces an output torque for driving the fuel cell powered vehicle in dependence on control of a motor controller 7. In the meantime, the output voltage supplied to the battery J/B 6 is supplied to and stored in a battery (secondary battery) 8.

Further, the electric power stored in the battery 8 is discharged in accordance with control of a battery controller 9, with discharged electric power being supplied to the drive motor 5 via the battery J/B 6.

Furthermore, the control system 100 of the fuel cell system is comprised of a fuel cell system 10, permitting the fuel cell stack 1 to perform electric power generation, which is operated in accordance with control of a system control section 11. The system control section 11 drivingly controls the fuel cell system 10 depending on a driving demand of the drive motor 5 from an external source to initiate or interrupt electric power generation of the fuel cell stack 1 for controlling the electric power to be generated by the fuel cell stack 1. When this takes place, the system control section 11 is applied with sensor signals from various sensors, described later, which are located in the fuel cell system 10, and controls the fuel cell system 10.

Moreover, the system control section 11 controls the electric power control section 4 to allow the electric power, delivered from the stack J/B 3, to be regulated and to be supplied to the battery J/B 6 and the drive motor 5 and controls the battery controller 9 for controlling charging and discharging of the battery 8, while also controlling the motor controller 7 to control a drive torque of the drive motor 5.

In the control device 100 of the fuel cell system, although a detail is described below, the system control section 11 executes the following:

(1) electric power generation startup control operation for starting up the fuel cell stack 1 to initiate electric power generation;

(2) fuel cell system monitoring control operation for monitoring operation of the fuel cell system 10; and (3) electric power generation stop control operation for stopping the fuel cell stack 1 to terminate electric power generation of the fuel cell stack 1.

[Concrete Structure of Fuel Cell System 10]

Figure 2:
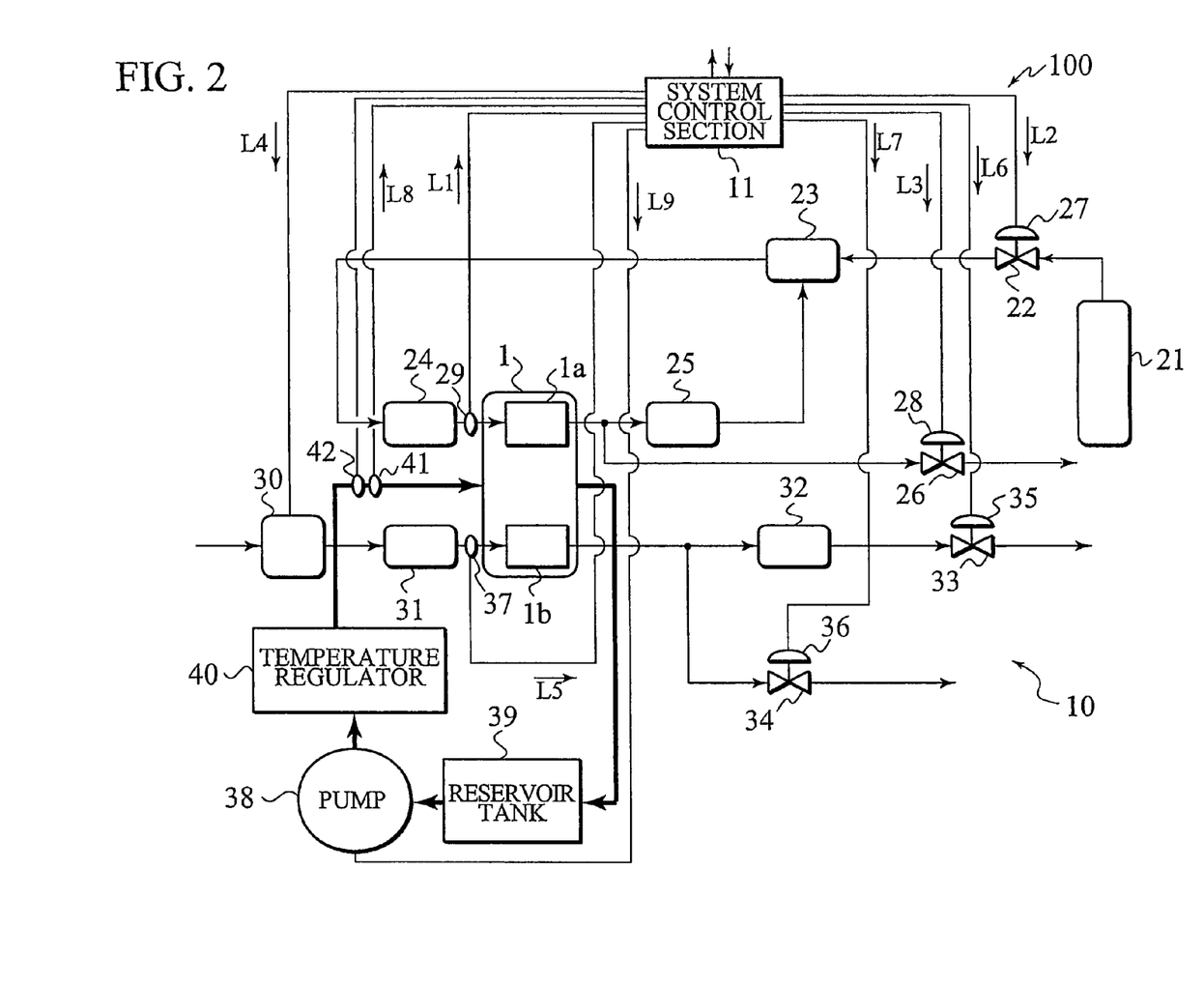
FIG. 2 is a block diagram illustrating a concrete structure of the fuel cell system.

Now, a concrete structure of the fuel cell system 10 is described with reference to FIG. 2.

The fuel cell stack 1 includes a fuel electrode 1*a* to which fuel gas is supplied and an air electrode 1*b* to which air is supplied, with the fuel electrode 1*a* and the air electrode 1*b* being joined to one another via a solid polymer film where respective ions transfer by means of medium composed of moisture to be brought into contact with one another to generate electric power. Also, the fuel cell stack 1 is internally equipped with a coolant water conduit for appropriately maintaining a fuel cell temperature.

Connected to such a fuel cell stack 1 via a hydrogen delivery pipe are a fuel storage tank 21, a fuel gas pressure control valve 22, an ejector recirculation unit 23 and a condensed water recovery unit 24, thereby supplying hydrogen to the fuel electrode 1*a* as fuel gas.

Fuel gas is compressed in the fuel storage tank 21 to remain under a high pressure and is reduced in pressure by the fuel gas pressure control valve 22 to be supplied to the ejector recirculation unit 23. Also, the present embodiment has been shown in conjunction with a case where the fuel storage tank 21 and the fuel pressure control valve 22 are in direct communication with one another, in addition, another valve for reducing pressure may be located in a midway between the fuel storage tank 21 and the fuel gas pressure control valve 22.

Fuel gas passing through the fuel gas pressure control valve 22 is supplied to the ejector recirculation unit 23 through a recirculation delivery pipe and mixed with fuel gas that passes through the fuel electrode 1*a* and supplied through a condensed water recovery unit 25, whereupon mixed fuel gas is delivered to the condensed water recovery unit 24 and supplied to the fuel electrode 1*a*. When this takes place, the condensed water recovery units 24, serve to condense steam through a radiation heat cooling effect resulting from delivery pipes extending through the fuel cell stack 1 from the ejector recirculation unit 23 to form moisture that is separated from fuel gas, with resulting fuel gas being supplied to the fuel cell stack 1 and the ejector recirculation unit 23.

Further, in a case where the electric power generation demand for the fuel cell stack 1 rapidly drops or the operation of the fuel cell stack 1 is interrupted, fuel gas which is not consumed by the fuel cell stack 1 is passed through a fuel gas exhaust valve 26, located downstream of a fuel gas stream of the fuel cell stack 1 and is, for instance, combusted in a hydrogen combustor and subsequently discharged to the outside. Also, although there are many probabilities where, in normal practice, the fuel gas exhaust valve 26 may include an ON/OFF valve to provide an ease of control, it may include a flow rate and pressure control valve whose opening degree is controllable.

Here, the system control section 11 reads in a sensor signal (indicated by an arrow L1) delivered from a fuel pressure sensor 29 disposed on the fuel gas delivery pipe between the condensed water recovery unit 24 and the fuel electrode 1*a* such that the fuel gas pressure supplied to the fuel electrode 1*a* is detected to control an actuator 27 which opens or closes the fuel gas pressure control valve 22 (as indicated by an arrow L2). By so doing, the flow rate and pressure of fuel gas to be supplied to the fuel electrode 1*a* are regulated and, additionally, an actuator 28 for opening and closing the fuel gas exhaust valve 26 is drivingly controlled (as shown by an arrow L3).

In the meantime, air is taken out from the atmosphere by a compressor 30 and compressed to be fed into an air delivery pipe. Here, since air compressed by the compressor 30 is raised at a high temperature, for the purpose of permitting reaction to take place in the fuel cell stack 1 at a high efficiency, air is cooled by an air cooler 31 mounted at an air inlet of the fuel cell stack 1 and supplied to the air electrode 1b. And, since air with oxygen constituent being consumed at the air electrode 1b of the fuel cell stack 1 while containing residual oxygen contains moisture resulting from reaction in the fuel cell stack 1, moisture is recovered in a water recovery unit 32 and, thereafter, air is expelled to the atmosphere through an air pressure regulator valve 33. Also, connected to an air exhaust side of the air electrode 1b is an air purge valve 34 that is rendered opened during an air purge mode.

Here, the system control section 11 drivingly controls the compressor 30 to regulate the air flow rate (as shown in an arrow L4) and reads in a sensor signal (as shown in an arrow L5) delivered from an air pressure sensor 37 disposed in an air delivery pipe between the air cooler 31 and the air electrode 1b to detect the air pressure supplied to the air electrode 1b so as to control an actuator 35 (as shown by an arrow L6) for opening and closing the air pressure regulator valve 33 such that the air pressure is regulated to allow the air pressure to be equalized with the fuel gas pressure. When this occurs, the system control section 11 controls the actuator 35 such that, when intended to increase the air pressure, the air pressure regulator valve 33 is operated in a closing direction. Also, the system control section 11 drivingly controls an actuator 36 (as shown by an arrow L7) such that, during a purge mode of the fuel electrode 1b, the air purge valve 34 is operated in an opening direction.

The fuel cell system 10 employs ethylene glycol with high boiling temperature as coolant water of the fuel cell stack 1. This coolant water is drawn by a pump 38 to be fed from a reservoir tank 39 into a coolant water circulation passage and fed into the fuel cell stack 1 via a temperature regulator 40 that operates in combination with a radiator and a fan to maintain the temperature at a constant level. By so doing, the temperature of the fuel cell stack 1 is regulated. Coolant water passage through a coolant water delivery pipe in the fuel cell stack 1 is heated by electric power generation of the fuel cell stack 1 and accumulated in the reservoir tank 39 prior to being circulated to the pump 38. This provides functions such as absorption of rapid pressure variation such as water hummer or an accumulator for the pump flow rate.

Further, disposed in the close proximity to the coolant inlet of the fuel cell stack 1 in the coolant water circulation passage are a coolant water pressure sensor 41 that detects a coolant water pressure and a coolant water temperature sensor 42 that detects a coolant water temperature. Also, although the present embodiment has been shown with reference to a case where the coolant water pressure sensor 41 and the coolant water temperature sensor 42 are disposed at the coolant inlet of the fuel cell stack 1, the present embodiment is not restricted thereto and these may be located at a coolant water outlet of the fuel cell stack 1.

Here, the system control section 11 reads in a sensor signal delivered from the coolant water pressure sensor 41 (as shown by an arrow L8) such that the pressure of coolant water supplied to the fuel cell stack 1 is detected to control the discharge flow rate of the pump 38 (as shown by an arrow L9) in dependence on the electric power output of the fuel cell stack 1. Also, other control technique for the coolant water pressure may include an orifice valve located in the coolant water circulation passage through which pressure control of coolant water is performed.

[Control Operation by System Control Section]

Next, various control operations to be performed by the system control section 11 of the control device 100 of the fuel cell system of the structure previously mentioned are described.

(1) Electric Power Generation Startup Control Operation

First, an operational sequence of electric power generation startup control operation of the system control section 11 for starting up the fuel cell stack 1 to initiate electric power generation is described with reference to a flowchart of FIG. 3. The electric power generation startup control operation is executed by the system control section 11 in synchronism with an internal timer of, for instance, a CPU (Central Processing Unit) equally divided time durations each for, for example, 10 msec.

For instance, if an electric power generation demand for the fuel cell stack 1 is inputted into the system control section 11 from outside, first in step S1, discrimination is made to see whether insulation resistance of an electric power system is extremely large to discriminate as to whether electric shock or short circuiting is apt to take place when the power supply of the electric power system is turned on. If it is discriminated that no electric shock or short circuiting occur when insulation resistance of a high voltage line 2 exceeds a given value and the electric power source is turned on, operation proceeds to step S2.

In step S2, prior to turning on the power supply, composed of the battery 8, by means of the battery J/B 6, a subtraction timer value TIM_chk1 for holding a preceding value of a sensor signal value delivered from the fuel supply system 10 is set to an initial value TIM_init1 (for instance, 10) to begin holding of the preceding values of respective sensor signal values (indicated by arrows L1, L2, L3 in FIG. 2) delivered from the fuel pressure sensor 29, the air pressure sensor 37 and the coolant water pressure sensor 41, allowing operation to proceed to step S3.

Here, the initial value TIM_init1 is set to have a time duration involving a startup timing (start time) at which electric power is taken out from the battery 8 in step S3 described later. In particular, the initial value TIM_init1 is set to have a period during which it is probable for noises to occur in the sensor signal when the electric power is taken out from the battery 8 and have a value that reaches zero at a time before various sensor signals are detected in step S6 described below.

In step S3, the battery controller 9 is controlled by the system control section 11 to turn on the battery J/B 6 and, in step S4, discrimination is made to see whether the voltage of the high voltage line 2 of the electric power system reaches a given range. If the system control section 11 discriminates that the electric power system voltage of the high voltage line 2 reaches the given range, operation proceeds to step S5. This given range means a range excluding a high voltage occurring when the electric power stored in the battery 8 begins to be supplied to the high voltage line 2 and is set to a range in which the voltage applied to the high voltage line 2 is stabilized.

In preparation for the following electric power generation startup of the fuel cell stack 1 in step S5, the system control section 11 starts up various parts forming the fuel cell system 10 and operation proceeds to step S6. In particular, the system control section 11 starts up peripheral units of the fuel cell stack 1, such as the compressor 30 for supplying air, the ejector circulation unit 23 for supplying fuel gas, the pump 38 for circulating coolant water and the temperature regulator 40.

In step S6, the system control section 11 is applied with the sensor signals (the arrows L1, L5, L8) from the fuel pressure sensor 29, the air pressure sensor 37 and the coolant water pressure sensor 41 and discriminates to see whether the hydrogen pressure, the air pressure and the coolant water pressure remain at respective stabilized levels sufficient for starting electric power generation of the fuel cell stack 1. If the system control section 11 discriminates that fluctuations in the respective sensor signals, resulting from the start at which the electric power is taken out from the battery 8, converge and the respective pressures stand stabilized, then, operation proceeds to step S7.

In step S7, for the purpose of setting the subtraction timer different from that of step S2, a subtraction timer value TIM_chk2 for holding the preceding value of the sensor signal value is set to an initial value TIM_init2 (for instance, 10) to begin holding of the preceding values of respective sensor signal values (indicated by arrows L1, L2, L3 in FIG. 2) delivered from the fuel pressure sensor 29, the air pressure sensor 37 and the coolant water pressure sensor 41, allowing operation to proceed to step S8, and controlling the stack J/B 3 and the electric power control section 4 begins taking out the electric power from the fuel cell stack 1 while terminating operation.

Here, the initial value TIM_init2 is set to have a time duration involving a startup timing (start time) at which electric power is taken out from the fuel cell stack 1 in step S8 described later. In particular, the initial value TIM_init2 is set to have a period during which it is probable for noises to occur in the sensor signal when the electric power is taken out from the fuel cell stack 1 and have a value that reaches zero at a time before various sensor signals are detected in step S6 described below.

(2) Fuel Cell System Monitoring Control Operation

Figure 4:
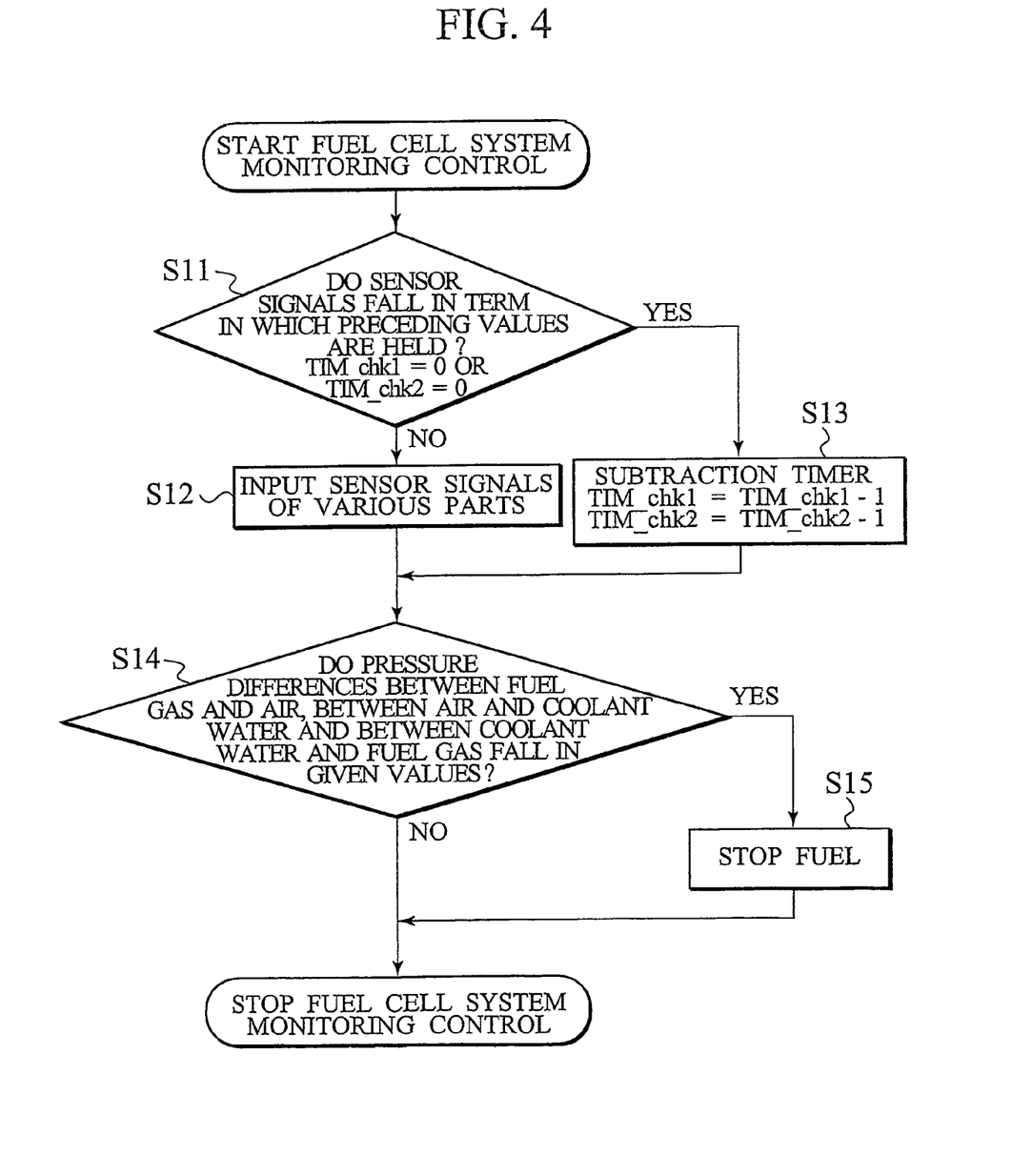
FIG. 4 is a flowchart illustrating an operational sequence of a fuel cell system monitoring control operation to be performed by the system control section for monitoring a status of the fuel cell system.

Next, an operational sequence of the system control section 11 for monitoring control operation of the fuel cell system for monitoring a status of the fuel cell system 10 after the fuel cell system 10 has been started up upon execution of the above-described fuel cell system monitoring control operation is described with reference to a flowchart of FIG. 4.

During fuel cell system monitoring control operation, independently of electric power generation startup control operation, an abnormality is monitored at the same time that the fuel cell system 10 has been stared up.

First in step S11, upon discrimination of the system control section 11 to see whether the subtraction timer value TIM_chk1, that is set in step S2, and the subtraction timer value TIM_chk2 set in step S7 do not fall to zero, the system control section 11 discriminates to see whether the sensor signal value remains in the period in which the preceding value is held.

If the system control section 11 discriminates that the sensor signal value does not fall in the period in which the preceding value is held, then, operation proceeds to step S12 and is applied with the sensor signals (the arrows L1, L5, L8) delivered from the fuel pressure sensor 29, the air pressure sensor 37 and the coolant water pressure 41 whereupon operation proceeds to step S14.

In the meantime, if the system control section 11 discriminates that the sensor signal value falls in the period in which the preceding value is held, operation proceeds to step S13 and respective subtraction timer values, which are set in step S2 and step S7, are subtracted while proceeding operation to step S14. That is, the system control section 11 performs operation of step S14 while holding the sensor signals in the respective preceding values.

In step S14, using the respective sensor signal values, the system control section 11 discriminates to see whether a differential pressure between the fuel gas pressure and the air pressure, a differential pressure between the air pressure and the coolant water pressure and a differential pressure between the coolant water pressure and the fuel gas pressure fall in given values and, if it is discriminated that the respective differential pressures fall in the respective given values, then, operation is terminated. Here, the given values to be compared with the respective differential pressures are set to differential pressure values, during system designs, which have probabilities to cause the fuel cell stack 1 to be damaged due to the respective pressure differences.

In the meantime, if the system control section 11 discriminates that either one of the differential pressures does not fall to the given value, the system control section 11 judges that either one of the pressure differences has an abnormal value and there is a probability of occurrence of damage in the fuel cell stack 1, and interrupts operations of various parts forming the fuel cell system 10 to stop the supply of fuel while terminating operation.

(3) Electric Power Generation Stop Control Operation

Figure 5:
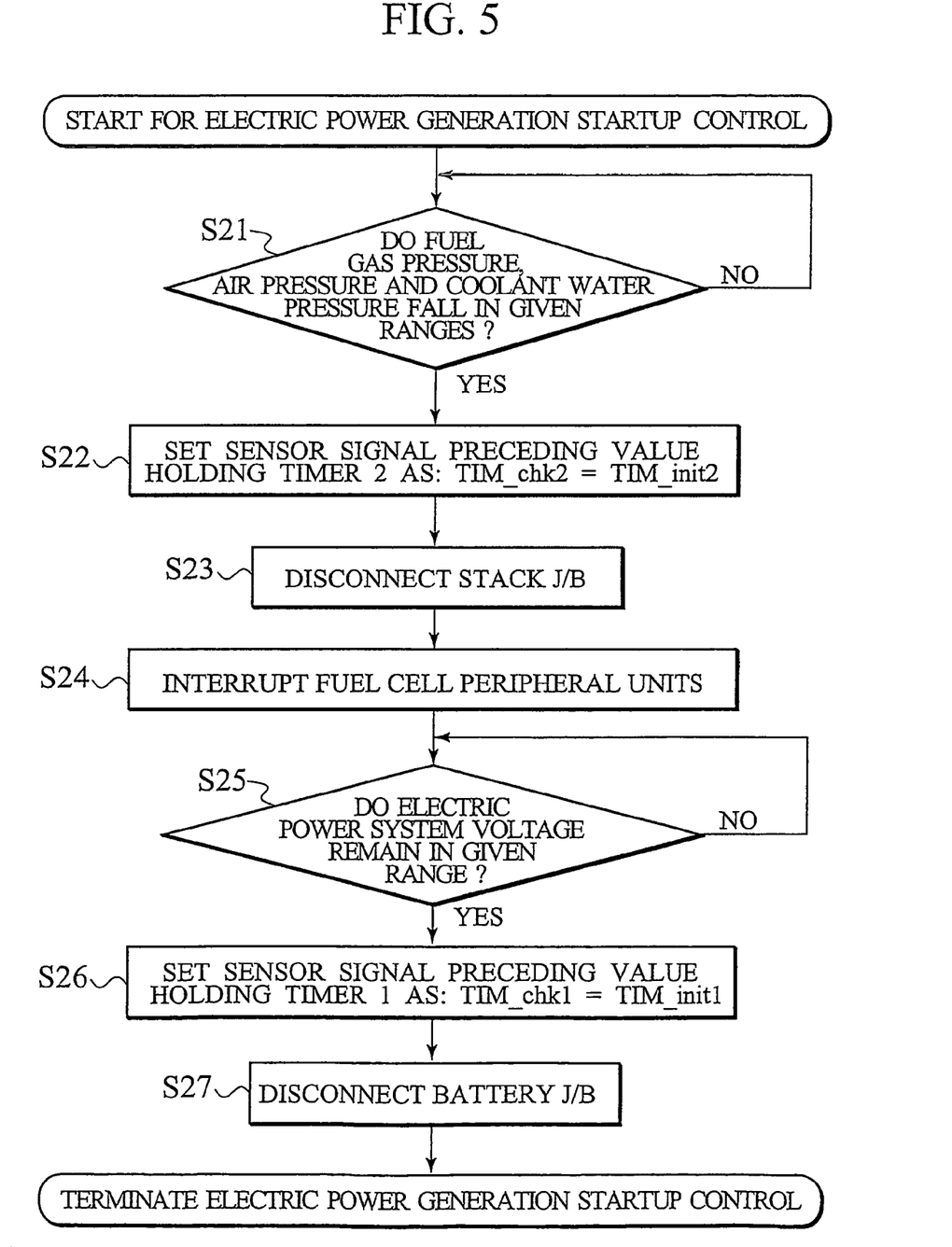
FIG. 5 is a flowchart illustrating an operational sequence of an electric power generation stop control operation to be performed by the system control section for stopping the electric power generation of the fuel cell system.

Next, an operational sequence of the system control section 11 for implementing electric power generation stop control operation to stop electric power generation of the fuel cell stack 1 is described with reference to a flowchart of FIG. 5.

For instance, if a request for stop of electric power generation of the fuel cell stack 1 is inputted to the system control section 11 from outside, first in step S21, the system control section 11 is applied with the respective sensor signals (indicated by the arrows L1, L5, L8) to discriminate whether the fuel gas pressure, the air pressure and the coolant water pressure remain in given ranges and, if it is discriminated that these remain in the given ranges, operation proceeds to step S22.

In step S22, the system control section 11 sets the subtraction timer value TIM_chk2, related to the fuel cell stack 1, to the initial value TIM_init2 to start subtraction of the subtraction timer value while holding the sensor signal values, and operation proceeds to step S23.

Here, the initial value TIM_init2 is set to have a time period involving a stop timing (stop time) for stopping the electric power from being taken out of the fuel cell stack 1 in step S23. In particular, the initial value TIM_init2 is set to have a period that has a probability of noises occurring in the sensor signal due to stop of the electric power being taken out from the fuel cell stack 1.

In step S23, the stack J/B 3 is controlled by the system control section 11 to cut out the voltage to be supplied to the electric power control section 4 from the fuel cell stack 1 and operation proceeds to step S24, interrupting operations of various parts forming the fuel cell stack 10 while proceeding operation to step S25.

In step S25, the system control section 11 discriminates to see whether the electric power generation of the fuel cell stack 1 in step S24 to cause the electric power system voltage in the high voltage line 2 to drop to allow the electric power system voltage in the high voltage line 2 to fall in a given range. If the system control section 11 discriminates that the electric power system voltage in the high voltage line 2 falls in the given range, operation proceeds to step S26.

In step S26, the subtraction timer value TIM_chk1, related to the battery 8, is set to the initial value TIM_init1 by the system control section 11 to begin subtraction of the subtraction timer value to allow operation to proceed to step S27, thereby blocking the voltage from being supplied from the battery to the drive motor 5 via the battery J/B 6 and terminating operation.

Here, the initial value TIM_init1 to be determined for the subtraction timer value TIM_chk1 is set to have a time duration involving a stop timing (stop time) to interrupt the electric power being taken out from the battery in step S27. In particular, the initial value TIM_init1 is set to have a period that has a probability of noises occurring in the sensor signal due to stop of the electric power being taken out from the battery 8.

Next, a control effect provided by the system control section 11 for performing such control operation is described with reference to FIGS. 6A to 6G.

Figure 6A:
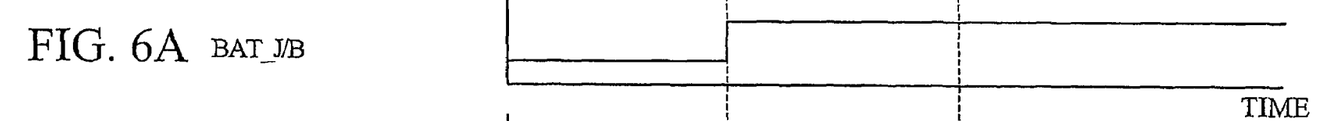
FIGS. 6A to 6G are views illustrating an effect of the control device of the fuel cell system to which the present invention is applied, with FIG. 6A showing operation of a battery J/B, FIG. 6B showing operation of a stack J/B, FIG. 6C showing a sensor signal produced by a fuel pressure sensor, FIG. 6D showing a sensor signal produced by a coolant water sensor, FIG. 6E showing a period in which a preceding value is held by the system control section, FIG. 6F representing a time change of a differential pressure between a fuel pressure gas and a coolant water pressure detected by the system control section and FIG. 6G representing a time change of the differential pressure between the fuel pressure gas and the coolant water pressure detected by a system control section of a comparison.
Figure 6B:
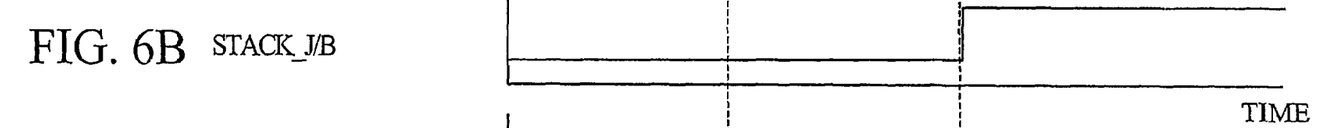
Figure 6C:
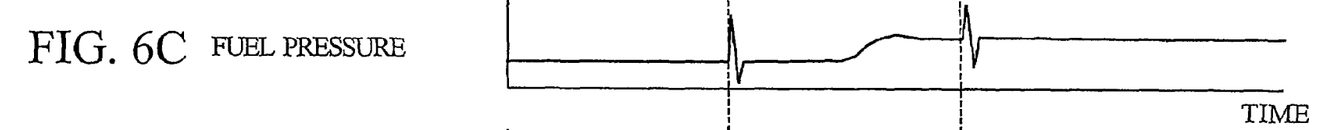
Figure 6D:
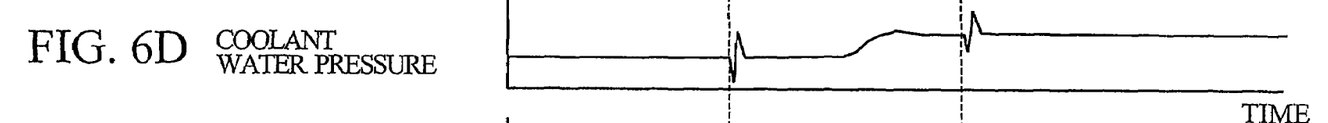
Figure 6E:
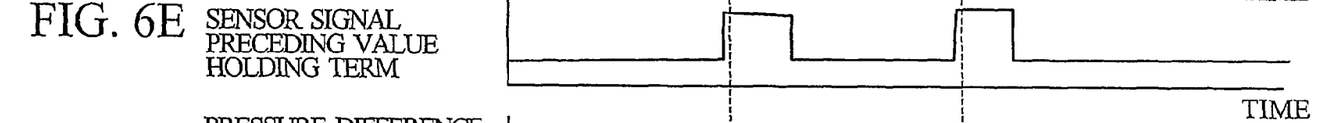

According to the control device 100 of the fuel cell system equipped with the system control section 11 which performs such control operation, if the electric power begins to be taken out from the battery 8 at a time T1 (see FIG. 6A), noises occur in the sensor signal (the arrow L1) delivered from the fuel pressure sensor 29 and the sensor signal (the arrow L8) delivered from the coolant water pressure sensor 41 (see FIGS. 6C, 6D). This is because of the fact that noises of the electric power system connecting the battery 8 and the drive motor 5 affect on control lines which connect the system control section 11 and the fuel cell system 10.

When this takes place, although, in the fuel cell system 10, there is no occurrence in rapid fluctuation in the differential pressure between the fuel gas pressure and the coolant water pressure, the system control section 11 comes to be applied with the sensor signals with profiles shown in FIGS. 6C and 6D.

Figure 3:
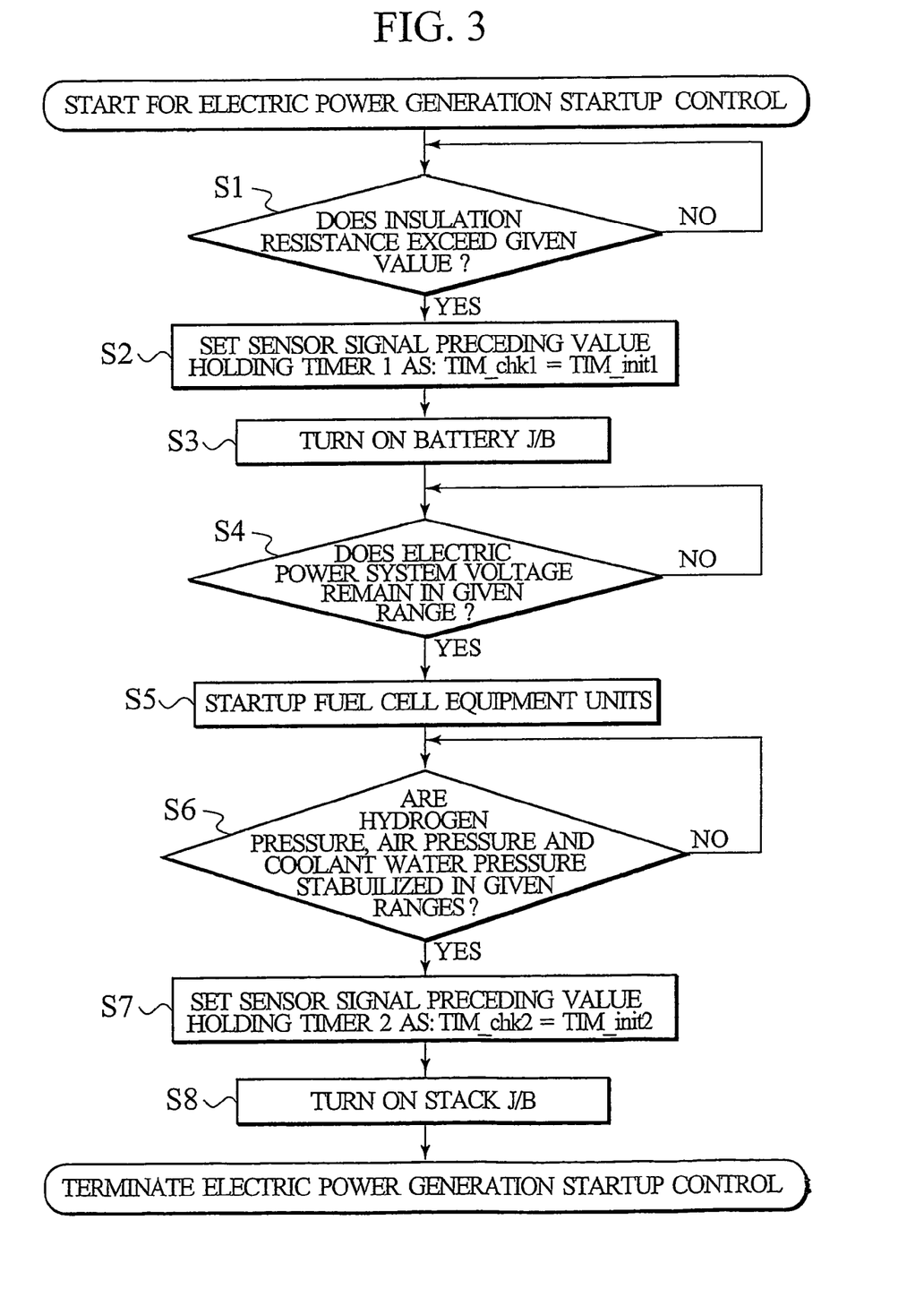
FIG. 3 is a flowchart illustrating an operational sequence of an electric power generation startup control operation to be performed by a system control section for starting up the fuel cell system to start electric power generation.

On the contrary, since the presently filed embodiment permits the sensor signals to be held in the respective preceding values in step S2 prior to electrical connection between the battery 8 and the drive motor 5 in step S3, as shown in FIG. 3, during the electric power generation startup control operation, even if noises occur in the sensor signal in step S3, the resulting signal value is not effective to control the fuel cell system 10. That is, in the system control section 11, as shown in FIG. 6F, since the sensor signal value appearing in step S2 is used, control of the fuel cell system 10 is performed under a condition where no differential pressure exists between the fuel gas pressure and the coolant water pressure.

Figures 6F, 6G:
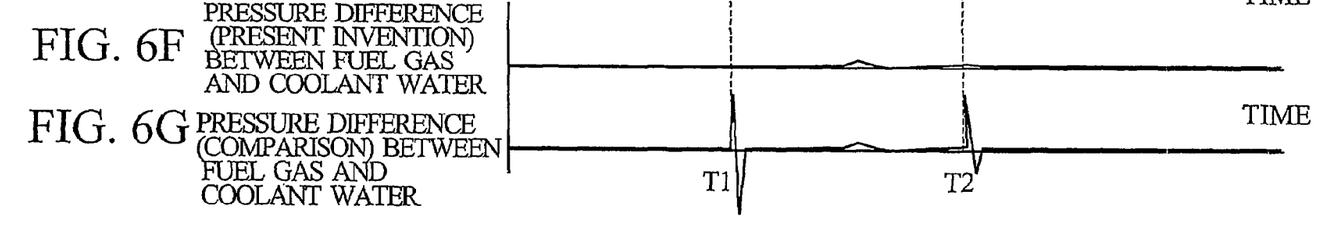

In a case where, as comparison with respect to the presently filed embodiment, if the sensor signal, associated with electrical connection between the battery 8 and the drive motor 5, is used as it is, as shown in FIG. 6G, there is a probability in which the system control section 11 makes an erroneous discrimination that the differential pressure between the fuel gas pressure and the coolant water pressure becomes large to stop operation of the fuel cell system 10 and, further, stops the start for electric power generation of the fuel cell stack 1.

Namely, since the presence of excessively increasing pressure difference between fuel gas and coolant water to be supplied to the fuel cell stack 1 leads the fuel cell stack 1 to be damaged, the system control section 11 monitors the differential pressures at all times and stops the fuel cell system 10 when detecting that the differential pressure increases to an extent causing the fuel cell stack 1 to be damaged.

Further, even if subsequent to electrical connection between the battery 8 and the drive motor 5, the fuel cell stack 1 generates electric power at time T2 and the fuel cell stack 1 and the drive motor 5 are electrically connected (see FIG. 6B), the presently filed embodiment controls the fuel cell system 10 under a condition with no recognition of the differential pressure, whereas comparison has a probability in which the differential pressure is recognized and operation of the fuel cell system 10 is stopped.

Consequently, according to the control device 100 of the fuel cell system of the presently filed embodiment, in a case where the fuel cell stack 1 and the battery 8, and the drive motor 5 are electrically connected to allow the electric power system power source to be turned on during the electric power generation startup control operation, even if noises occur in the sensor signal vales to be supplied from the fuel cell system 10 to the system control section 11, it is possible to prevent the fuel cell system 10 from making erroneous discrimination in that the differential pressure between fuel gas and coolant water becomes large.

Furthermore, since the control device 100 of such a fuel cell system performs the fuel cell system monitoring control operation under the condition where the sensor signals are held in the preceding values for the period during which the subtraction timer value reaches zero after the electric power system has been turned on, it is possible to preclude erroneous discrimination in that a large pressure difference occurs in the period when noises occur in the sensor signals due to power supply turning-on of the electric power system.

Moreover, according to the control device 100 of the fuel cell system, even if noises occur in the sensor signal values when interrupting operation of the electric power system during electric power generation startup control operation, it is possible to preclude the fuel cell system 10 from making erroneous discrimination in that the differential pressure between fuel gas and coolant water is large.

In addition, according to the control device 100 of the fuel cell system, since discrimination is made that, prior to holding the respective sensor signals in the preceding values, the fuel gas pressure, the air pressure and the coolant water pressure are adequately stabilized in a state necessary for starting the electric power generation of the fuel cell stack 1, it is possible to accurately perform control of a status where pressures assume values for the start of the electric power generation using the sensor signals delivered from the respective sensors, thereby reliably precluding the fuel cell stack 1 from being damaged due to an increase in each pressure difference during such a period.

Also, the above-described embodiment forms an example of the present invention. For this reason, the present invention is not limited to the presently filed embodiment set forth above and, of course, when the invention is embodied in other forms, various modifications may be made in compliance with designs without departing from the technical concept of the present invention.

The entire content of Japanese Application No. P2002-178975 with a filing date of Jun. 19, 2002 is herein incorporated by reference.

Although the present disclosure has been described above by reference to certain embodiments of the invention, the invention is not limited to the embodiments described above and modifications will occur to those skilled in the art, in light of the teachings. The scope of the invention is defined with reference to the following claims.

INDUSTRIAL APPLICABILITY

According to the present invention, since during a start for taking out electric power from a fuel cell stack 1 and a stop of a fuel cell system, sensor signals are held in preceding values under a condition where gas supply pressures are stabilized, it is possible to prevent erroneous diagnosis from being caused by noises even in occurrence of noises in the sensor signals during the start and stop of the electric power being taken out from the fuel cell stack.

The invention claimed is:

1. A fuel cell control system comprising:
   a fuel cell stack;
   a fuel cell system for taking out an electric power generated by the fuel cell stack to be supplied to a load; and
   a control section for controlling an electric power generating operation of the fuel cell stack based on a sensor signal inputted from a sensor disposed in the fuel cell system,
   wherein the control section controls the fuel cell system such that, during startup of the fuel cell system, a gas supply pressure of the fuel cell stack in compliance with the sensor signal inputted from the sensor is discriminated to be stabilized at an electric power generation start pressure of the fuel cell stack, a time duration, involving an electric power taking out start timing at which the electric power is taken out from the fuel cell stack, is set as a period in which the sensor signal is held at a preceding value and gas supply to the fuel cell stack is commenced based on the sensor signal held at the preceding value.

2. The fuel cell control system according to claim 1, wherein the control section controls the fuel cell system so as to begin gas supply to the fuel cell stack after an elapse of a given time interval from a start of taking out electric power stored in a secondary battery.

3. A fuel cell control system comprising:
   a fuel cell stack;
   a fuel cell system for taking out an electric power generated by the fuel cell stack to be supplied to a load; and
   a control section for controlling an electric power generating operation of the fuel cell stack based on a sensor signal inputted from a sensor disposed in the fuel cell system,
   wherein the control section controls the fuel cell system such that, during stop of the fuel cell system, a gas supply pressure of the fuel cell stack in compliance with the sensor signal inputted from the sensor is discriminated to be stabilized, a time duration, involving an electric power taking out start timing at which the electric power is taken out from the fuel cell stack, is set as a period in which the sensor signal is held at a preceding value and gas supply to the fuel cell stack is interrupted based on the sensor signal held at the preceding value.

4. A fuel cell control system comprising:
   a fuel cell stack;
   a fuel cell system for taking out an electric power from the fuel cell stack to be supplied to a load; and
   control means for controlling an electric power generating operation of the fuel cell stack based on a sensor signal inputted from a sensor disposed in the fuel cell system,
   wherein the control means controls the fuel cell system such that, during startup of the fuel cell system, a gas supply pressure of the fuel cell stack in compliance with the sensor signal inputted from the sensor is discriminated to be stabilized at an electric power generation start pressure of the fuel cell stack, a time duration, involving an electric power taking out start timing at which the electric power is taken out from the fuel cell stack, is set as a period in which the sensor signal is held at a preceding value and gas supply to the fuel cell stack is commenced based on the sensor signal held at the preceding value.

5. A fuel cell control system comprising:
   a fuel cell stack;
   a fuel cell system for taking out an electric power generated by the fuel cell stack to be supplied to a load; and
   control means for controlling an electric power generating operation of the fuel cell stack based on a sensor signal inputted from a sensor disposed in the fuel cell system,
   wherein the control means controls the fuel cell system such that, during stop of the fuel cell system, a gas supply pressure of the fuel cell stack in compliance with the sensor signal inputted from the sensor is discriminated to be stabilized, a time duration, involving an electric power taking out start timing at which the electric power is taken out from the fuel cell stack, is set as a period in which the sensor signal is held at a preceding value and gas supply to the fuel cell stack is interrupted based on the sensor signal held at the preceding value.

6. A fuel cell control method comprising:
   calculating a gas supply pressure related to a fuel cell stack from a sensor signal inputted from a sensor disposed in a fuel cell system during startup of the fuel cell system;
   discriminating that the gas supply pressure is stabilized at an electric power generation start pressure of the fuel cell stack;
   setting a time duration, involving an electric power taking out start timing at which an electric power is taken out from the fuel cell stack, as a period in which the sensor signal is held at a preceding value; and
   controlling the fuel cell system so as to begin gas supply to the fuel cell stack based on the sensor signal held at the preceding value.

7. A fuel cell control method comprising:
   calculating a gas supply pressure related to a fuel cell stack from a sensor signal inputted from a sensor disposed in a fuel cell system during stop of the fuel cell system;
   discriminating that the gas supply pressure is stabilized at an electric power generation start pressure of the fuel cell stack;
   setting a time duration, involving an electric power taking out start timing at which an electric power is taken out from the fuel cell stack, as a period in which the sensor signal is held at a preceding value; and
   controlling the fuel cell system so as to stop gas supply to the fuel cell stack based on the sensor signal held at the preceding value.

8. The fuel cell control system according to claim 1, wherein the preceding value is a previous measurement inputted from the sensor.

9. The fuel cell control system according to claim 3, wherein the preceding value is a previous measurement inputted from the sensor.

10. The fuel cell control system according to claim 4, wherein the preceding value is a previous measurement inputted from the sensor.

11. The fuel cell control system according to claim 5, wherein the preceding value is a previous measurement inputted from the sensor.

12. The fuel cell control method according to claim 6, wherein the preceding value is a previous measurement inputted from the sensor.

13. The fuel cell control method according to claim 7, wherein the preceding value is a previous measurement inputted from the sensor.

* * * * *